Figure 1:
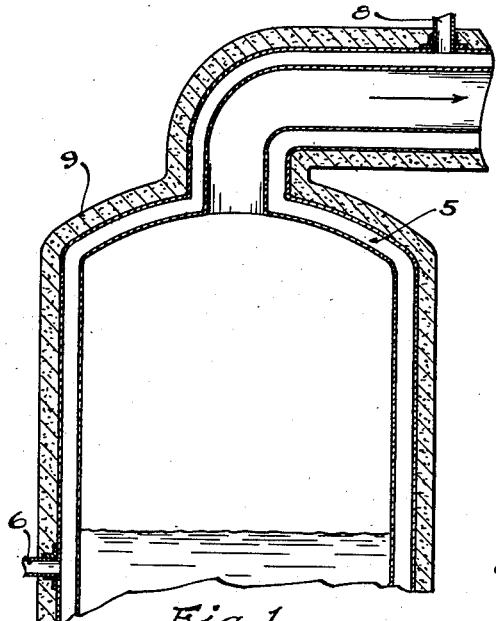

Sept. 10, 1946.　　　G. W. PHELPS ET AL　　　2,407,616
METHOD OF DEODORIZATION
Filed Nov. 10, 1941

Guy W. Phelps
and Howard C. Black
INVENTOR

ATTEST-　　　BY　　　ATTORNEY

Patented Sept. 10, 1946

2,407,616

UNITED STATES PATENT OFFICE 2,407,616

METHOD OF DEODORIZATION

Guy W. Phelps and Howard C. Black, Chicago, Ill., assignors to Industrial Patents Corporation, Chicago, Ill., a corporation of Delaware Application November 10, 1941, Serial No. 418,552

15 Claims. (Cl. 260—398.5)

This invention relates to the improvement of fatty materials and more particularly it is directed to the treatment of fatty material to improve the odor, purity, color, taste and/or stability in an economical, convenient and novel manner.

Natural and synthetic fatty materials contain varying amounts of different substances which affect the odor, taste, color and/or stability of the product. It is a general practice in improving the fatty materials to attempt to remove these impurities and/or to alter the product by a combination of steps including alkali-refining to remove the free fatty acids, hydrogenating at an elevated temperature in the presence of a catalyst, bleaching the product with fuller's earth or similar material, deodorizing with steam and vacuum at an elevated temperature, and stabilizing the final product by incorporating the antioxidant therein. Even after this involved purification, in many cases the product reverts to its original taste, odor, color and degrades rapidly, particularly on standing in the presence of light and air.

It has now been found possible to greatly improve the fatty materials as to their odor, color, taste, and their resistance to reversion and degradation by a considerably simpler and more economical process.

It has been discovered that during the deodorization of the fatty material, the step of heating the steam vapors leaving the body of fatty material so that there is no tendency to reflux, not only substantially shortens the period of treatment and permits lower liquid temperatures, with consequent minimization of hydrolysis, but also brings about the removal of many impurities not previously separated and causes less breakdown of the product under treatment. The products are of better color, odor, taste, and have improved resistance to reverting and degrading. Furthermore, and of utmost importance, crude materials, many of which have previously not been considered useful, can be employed in the preparation of first grade products without expensive refining steps. In fact, many of such substances have now been found to yield products of greater stability because of the omission of the usual refining step.

Although the aforementioned, improved deodorization treatment with the novel consequent purification effects unusual and unpredictable results, it has also been found that the incorporation of an antioxidant into the fatty material under treatment during the deodorizing process, greatly increases the stability of the final product over that obtainable by the incorporation of an antioxidant after said treatment. Any antioxidant present during the treatment improves the results, but there are two types of antioxidants which exhibit this unpredictable property in a surprising manner. They are (1) polyhydric phenols, such as gum guaiac, and their acyl derivative and partial esters and (2) olefinic and/or hydroxy substituted low molecular weight polycarboxylic acids, such as citric acid, tartaric acid, and malic acid.

The treatment of the fatty material is generally conducted according to the principles of the invention by placing crude and/or refined fatty material with or without previous hydrogenation and/or bleaching preferably along with an antioxidant, such as gum guaiac, citric acid, or mixtures thereof, into a heated, closed vessel having open steam ports as well as closed steam coils in the bottom thereof. The material at a temperature of about 200° to 450° F., depending on the nature of the composition under treatment, is usually subjected to a vacuum, generally about twenty to thirty inches of mercury, e. g. 29 inches, while passing steam therethrough at a temperature slightly above that of the material under treatment.

Heat is applied in the upper part of the vessel either directly by steam or preferably by indirect means so that the vapors which are withdrawn near the top are prevented from cooling materially and are preferably raised in temperature thereby preventing substantial condensation and reflux of vaporized impurities. The temperature in the upper part of the vessel is advantageously maintained at the temperature of or near the temperature of the liquid, preferably at a temperature of at least about 250° F. This may be obtained by passing steam, mineral oil vapor, diphenyl vapor, diphenyl ether vapor, or other suitable vapors or mixed vapors, heat exchange liquids including molten salts, or the like, through passages, pipes, tubes, zones, or other indirect heating means in the vapor path, in the walls and/or the outside of the deodorizing vessel. The vapors are withdrawn near the top of the vessel and passed through a condenser to recover high boiling organic materials, then to a steam ejector and finally a barometric condenser wherein the steam is condensed.

The products obtained from this procedure have a substantially lower impurity content, particularly of a fatty acid nature. Furthermore, the smoke point thereof is raised considerably.

The stability of the deodorized product is surprisingly increased. These improved results are obtained with treating for only a fraction of the time normally employed when the vapors are permitted to be maintained at a temperature at which substantial reflux takes place.

The accompanying drawing illustrates a few of the various satisfactory methods for the maintaining of the temperature of the vapors issuing from the body of fatty material under treatment. They are not, of course, intended to be limiting on the scope of the present invention.

Figure 2:
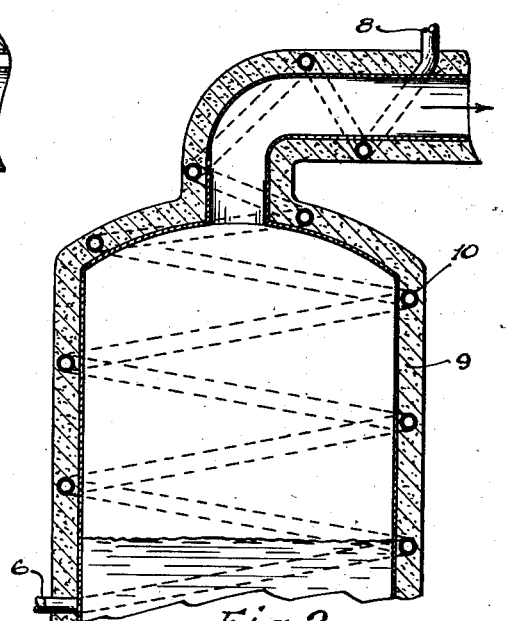
Figure 3:
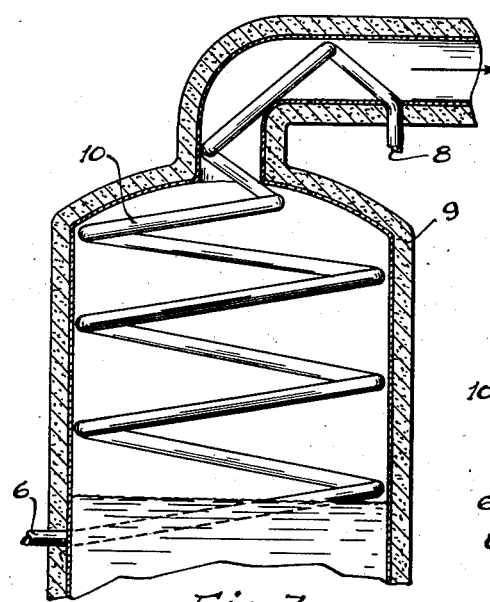
Figure 4:
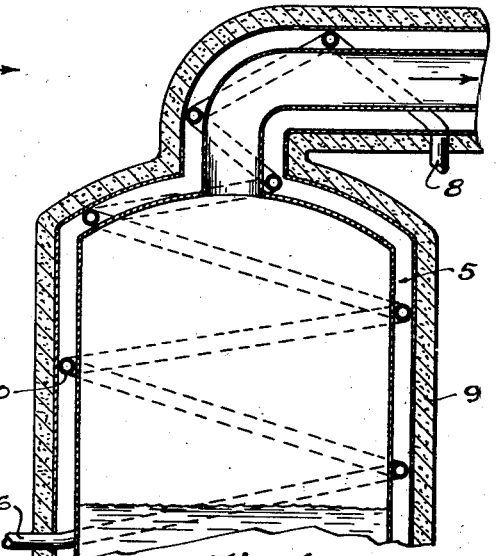

In the drawing, Figure 1 shows a vertical sectional view through the top of a deodorizer which may be used in the present invention, Figure 2 shows a view similar to that of Figure 1 showing a steam coil instead of a steam jacket in the walls or outside the top of the deodorizer, Figure 3 shows a system similar to that of Figure 2 wherein the coils are inside the top of the deodorizer, and Figure 4 shows a jacket around the top of the deodorizer filled with a heating medium which may be heated by means of steam coils located therein.

Referring to Figure 1 the top of the deodorizer is heated by means of a jacket 5 within the vessel to prevent the cooling of the exiting gases. In this jacket it is possible to circulate high pressure steam, Dowtherm, mineral oil vapor, or other vapor, or other heat transfer medium such as molten salts, mercury, organic or inorganic liquid, including solutions, or the like, introduced through the inlet 6 and withdrawn through the outlet 8. These heat transfer mediums may be heated elsewhere by steam coils, direct heat, electric heat or by heat exchange from any other source including the cooling of deodorized oil or other hot metal. The heat transfer medium is then circulated through the jacket and then reheated for recirculating. The jacket may extend throughout the interior of the vessel if it is desired to maintain the liquid and vapors at the same temperature, or the jacket may be made in sections particularly if different temperatures are wanted in the various parts thereof. A jacket may be similarly placed on the outside for the top or all of the vessel. The exterior of the vessel is preferably covered with an insulation 9, such as asbestos.

In Figure 2 the heat exchange medium is circulated in closed coils 10 in the walls or outside the top of the deodorizer. As shown, the coils contact the walls of the deodorizer which is covered with insulation 9.

The system shown in Figure 3 is similar to that of Figure 2 except that the coils 10 are inside the top of the deodorizer whereby the vapors are heated by direct contact with the coils.

As shown in Figure 4 the system may be provided with a jacket 5 around the top which can be filled with a heat transfer medium such as oil or other organic or inorganic liquid which is heated by means of coils 10 immersed in the medium through which coils passes steam, Dowtherm vapor, or other heat exchange medium.

Any of the systems may be used alone or in combination for heating the vapors or the entire treating vessel. They may be employed in parallel for a plurality of vessels. In any case it is preferable to have at least the vapor portion of the vessel lagged with suitable insulating material to minimize heat loss and prevent temperature drop and variation. By this means it is possible to maintain the temperature at a constant desired temperature, preventing or replacing heat loss through the walls and in certain cases increasing the heat content. Conduction, radiation, and the convection losses are reduced to a minimum by employing the lagging such as asbestos or the like. The temperature of the liquid is more readily maintained by use of the jacket or the like even when only around the vapor section of the vessel.

As pointed out hereinbefore, absolute values cannot be fixed for the treatment of all fatty materials because of the variable nature of the valuable constituents thereof as well as the impurities therein. For example, it has been found that for operation in the deodorization of vegetable oils of various types, it is desirable to employ oil temperatures of the order of 350° to 450° F. Steam is usually introduced in such a heat mixture at a pressure of about 50 to 150 pounds per square inch and a temperature of about 300° to 400° F. In such operation the temperature of the vapors is preferably kept at a value of 250° to 350° F. or higher in order to avoid condensation, whereas in prior practice, temperatures of 200° to 250° F. were normally existent.

On the other hand, with animal fats it has now been found that although the above operating temperatures are effective, even more desirable results are obtained by employing oil temperatures of 200° to 300° F., preferably at least 250° F., with slightly lower vapor and steam temperatures than those employed in the vegetable oil treatment.

The following examples are given for the purpose of illustrating the present invention but are not intended to be limiting on the scope thereof.

A prime steam lard having a free fatty acid content of about 0.38%, a smoke point of 360° F., and a stability of about three hours by the active oxygen method, is divided into two portions and each treated separately in a deodorizing vessel of standard construction, but which has been equipped with a jacket around the exterior of the upper or vapor portion of the vessel. The two portions of lard are treated at a temperature of 350° F. and a vacuum of 29¼ inches of mercury for a period of two hours, the treatments differing in that in only one steam is introduced into the jacket at a pressure of 250 lbs./sq. in. so that the temperature therein is about 400° F., thereby substantially preventing the cooling of the vapors and the consequent condensation and reflux of organic material into the body of oil or liquid fat under treatment. The following table sets forth the results obtained:

*Table I*

|  | Jacket on | Jacket off |
|---|---|---|
| Oil temperature, ° F | 350 | 350 |
| Vapor temperature (at neck of deodorizer), ° F | 260 | 230 |
| Vacuum (inches Hg) | 29¼ | 29¼ |
| Original free fatty acids (percent oleic) | 0.38 | 0.38 |
| Time of deodorization hrs | 2 | 2 |
| Final free fatty acid (percent oleic) | 0.035 | 0.11 |
| Active oxygen keeping test hrs | 5 | 2 |
| Peroxide value after 4 days' incubation at 140° F | 10 | 20 |

The product deodorized with the jacket on has at least twice the stability of the product deodorized without the jacket.

The following data shows that with the use of the jacket, free fatty acids may be readily removed even at 300° F., while without the jacket free fatty acids are only very slowly removed:

*Table II*

|  | Jacket on | Jacket off |
|---|---|---|
| Oil temperature, ° F | 300 | 300 |
| Vacuum (inches, Hg) | 29¼ | 29¼ |
| Original free fatty acids (percent oleic) | 0.39 | 0.39 |
| Time of deodorization hrs | 3 | 3 |
| Final free fatty acids (percent oleic) | 0.19 | 0.37 |
| Active oxygen keeping test hrs | 2 | 1 |
| Color | 9 yel.-1 red | 10 yel.-2.1 red |

Here, also, it is seen that the product deodorized with the jacket on is more stable than that deodorized without the jacket.

The following examples employing a similar apparatus to treat other fatty materials bear out the unusual and unpredictable results obtained with lard.

The next table gives the essential details for the deodorization at a temperature of about 400° F. of a mixture of 80% refined and hydrogenated cottonseed oil and 20% lard with a free fatty acid content of 0.08%:

*Table III*

|  | Jacket on | | Jacket off | | |
|---|---|---|---|---|---|
| Steam pressure in jacket lbs./sq. in | 250 | | | | |
| Time required to heat batch | 44 min. | | | | 63 min. |
| Time of deodorization | 1 hr. | 2 hrs. | 1 hr. | 2 hrs. | 3 hrs. |
| Vapor temp., ° F. (above oil) | 335 | 335 | 260 | 270 | 275 |
| Vapor temp., ° F. (at neck) | 288 | 288 | 196 | 196 | 198 |
| Free fatty acids (percent oleic) | 0.02 | 0.015 | 0.045 | 0.04 | 0.03 |
| Flavor | Fair | Good | Poor | Poor | Fair |

The difference in rate of removal of fatty acids is quite striking.

The following table gives the results of the deodorization of prime steam lard containing 0.05% gum guaiac added in acetic acid solution

*Table IV*

|  | Jacket on | Jacket off |
|---|---|---|
| Steam pressure in jacket lbs./sq. in | 250 |  |
| Deodorization time hrs | 2 | 2 |
| Batch temp., ° F | 400 | 395 |
| Vapor temp., ° F. (above liquid) | 335 | 305 |
| Free fatty acids of original lard (as oleic) | 0.38 | 0.38 |
| Free fatty acids after deodorization | 0.03 | 0.14 |
| Flavor of deodorized product | Good | Good |

It is seen that the fatty acid content is reduced much further when the jacket is on.

The values for the same type of raw material as in Table IV, except that the original free fatty acid content is higher are given in Table V.

*Table V*

|  | Jacket on | Jacket off |
|---|---|---|
| Steam pressure in jacket lbs./sq. in | 250 |  |
| Time required to heat batch minutes | 25 | 40 |
| Deodorization time hours | 2 | 2 |
| Batch temp., ° F | 400 | 383 |
| Vapor temp., ° F. (above liquid) | 325 | 278 |
| Vapor temp., °F. (at neck) | 300 | 233 |
| Free fatty acids (original lard) | 0.68 | 0.68 |
| Free fatty acids, after deodorizing | 0.05 | 0.14 |
| Flavor of deodorized product | Very good | Good |

Again it is seen that the free fatty acids are more efficiently removed when the vapor temperatures are higher.

The treatment of bleached prime steam lard is covered in the next tabulation.

*Table VI*

|  | Original | Jacket on | Jacket off |
|---|---|---|---|
| Oil temperature, ° F |  | 392 | 392 |
| Exit vapor temp., ° F |  | 392 | 122-162 |
| Free fatty acids (per cent oleic) | 0.36 | 0.17 | 0.31 |
| Time of deodorization | 0 | 2 | 2 |
| Active oxygen stability in hours | 3 | 4 | 3 |
| Smoke point, ° F | 360 | 385 | 355 |

Table VII sets forth the results on bleached palm oil:

*Table VII*

|  | Original | Jacket on | Jacket off |
|---|---|---|---|
| Oil temperature, ° F |  | 410 | 404 | 410 |
| Exit vapor temp., ° F |  | 405 | 408 | 137 |
| Free fatty acids (per cent oleic) | 1.50 | 0.65 | 0.05 | 0.70 |
| Time of deodorization | 0 | 2 hrs. | 3 hrs. | 3 hrs. |
| Active oxygen stability in hours | 50 | 70 | 80 | 50 |
| Smoke point, ° F | 300 | 340 | 392 | 330 |
| Flavor | Poor | Fair | Bland | Fair |

Table VIII discloses the value obtained for the treatment of crude coconut oil.

*Table VIII*

|  | Original | Jacket on | Jacket off |
|---|---|---|---|
| Oil temperature, ° F |  | 405 | 405 | 400 |
| Exit vapor temp., ° F |  | 408 | 405 | 140 |
| Free fatty acids (percent oleic) | 3.00 | 0.70 | 0.05 | 0.40 |
| Time of deodorization | 0 | 2 hrs. | 3 hrs. | 3 hrs. |
| Active oxygen stability in hours | 85 | 100 | 105 | 75 |
| Smoke point, ° F | 220 | 300 | 350 | 290 |
| Flavor | Poor | Fair | Good | Fair |

From the foregoing examples it can be seen that by the novel treatment of the fatty material it is possible to eliminate previous alkali refining and still obtain a stable bland product substantially free of fatty acids and other impurities in a relatively short time. However, it is within the scope of the invention to previously refine the oil or fat by any other procedure, such as alkali refining, solvent extracting, degumming with water and/or the like. It is advantageous at times to bleach the fatty material with or without previous refining by adding thereto about 0.1 to 3.0%, e. g. 0.25%, of fuller's earth, filtercel or the like, at a temperature necessary to obtain fluidity, e. g. about 160 to 170° F. for lard, and then filtering.

The omission of the refining step not only is desirable from an economical view, but it also leads to a more stable product. It has been found that crude fats and oils contain valuable anti-oxidants which are removed in the normal refining process steps. It has now been found that these crude fats, which formerly have not been considered usable directly in the production of first grade shortenings without a previous refining step, can be employed in the manufacture of even superior product without such refining. Crude vegetable oils, preferably after hydrogenation and with or without bleaching, can now be readily employed in the production of shortening in large quantities of the order of 30% or more. Compared with products which have been prepared from the previously refined corresponding vegetable oils, the new products, containing at least 30% hydrogenated crude vegetable oil treated by the present method, are not only more stable but also yield products of improved baking properties.

As pointed out hereinbefore, for preventing reversion and increasing stability, the deodorization treatment of lard, tallow, and other animal fats is preferable at a low temperature in the range of 200 to 300° F., e. g. 220° F., and a vacuum of about 27.5 to 29.5 inches of mercury. Although these liquid temperatures are relatively low, it is possible to remove fatty acids and other impurities easily by the present method since the vapor temperatures are maintained at about the same value, around 200° to 300° F., thereby preventing reflux. Although it is not necessary, it is possible to raise the temperature of the vapors after issuance from the liquid fatty material, but generally they are at a lower or at the same temperature as that of the liquid. In other words, the present invention is directed to maintenance of the vapor temperature at value of at least 200° F. after issuance from the liquid, and preferably of the order of 250° to 400° F.

Among the materials which may be improved by the present means are olive oil, butter, lard, cottonseed oil, soy bean oil, peanut oil, tallow, sesame oil, coconut oil, palm oil, palm kernel oil, safflower oil, sunflower oil, linseed oil, teaseed oil, chaulmoogra oil, menhaden oil, sardine oil, spermaceti, sperm oil, whale oil, fish liver oils, vitamin concentrates, beeswax, wool fat, castor oil, almond oil, cocoa butter, cashew nut oil, cashew nut shell oil, chicken fat, kapok oil, corn oil, rape oil, oiticica oil, perilla oil, tung oil, the full and partial hydrogenated derivatives of these oils, the individual fatty glyceride acids therein and mixtures thereof.

The fatty material may contain one or more of the following antioxidants and modifying agents such as citric acid, malic acid, maleic acid, fumaric acid, aconitic acid, citramalic acid, itamalic acid, citraconic acid, paraconic acid, itaconic acid, protaconic acid, isaconic acid, mesaconic acid, mucic acid, tartaric acid, tartronic acid, hydroxyglutaric, trihydroxyglutaric, and other hydroxy and/or unsaturated polycarboxylic acids, their esters or their anhydrides; polyhydric phenols such as gum guaiac, resorcinol, hexylresorcinol, pyrocatechol, pyrogallol and hydroquinone, and their acyl and partial esters derivatives; phosphoric acid, salicylic acid, benzoic acid, pyrogallol-acetone condensation product, aminophenol, mono- and di-hydroxy napthalene, and the like, glycerol, polyglycerols, ethylene glycol, polyglycols, propylene glycols, tetrahydrofurfuryl alcohol, ethyl alcohol, acetic acid, propionic acid, lactic acid, fatty and partial glycerides, fatty acid alkylolamides, amino-fatty acid esters, and the like can also be incorporated, sometimes as modifying agents and other times being employed as solvents for assisting in the incorporation of gum guaiac into the organic material to be stabilized. The use of the ultimate composition determines the type of agent which may be so incorporated.

Obviously, many modifications and variations of the invention hereinbefore set forth may be made without distinguishing from the spirit and scope thereof, and therefore only such limitations should be imposed as are indicated in the appended claims.

We claim:

1. The process of deodorizing relatively nonvolatile fatty materials containing free fatty acids and odorous materials, which comprises passing steam through a body of said fatty material at a temperature of at least 200° F. under a vacuum and removing vapors in sufficient amount to substantially reduce the free fatty acids and to improve the odor of the liquid material while supplying heat to the vapors above said body of fatty material so as to maintain sufficient of the vapor zone at a temperature above the condensation point of the vapors to prevent condensate from returning to the liquid fatty material under treatment.

2. The process of deodorizing relatively nonvolatile higher fatty acid esters of polyhydric alcohols containing free fatty acids and odorous materials, which comprises passing steam through a body of said fatty material maintained at a temperature of at least 200° F. and under a vacuum of at least 27 inches of mercury and removing vapors in sufficient amount to substantially reduce the free fatty acids and to improve the flavor of the liquid material while supplying heat to the vapors above said body of fatty material so as to maintain the vapors at a temperature above their condensation point until removed to a point where vapor condensate cannot return to the material under treatment.

3. The process of deodorizing animal and vegetable fats containing free fatty acids and odorous materials, which comprises passing steam through a body of said fat at a temperature of at least 200° F. under vacuum and removing vapors in sufficient amount to substantially reduce the free fatty acids and to improve the flavor of the liquid material and supplying heat to the vapor zone to maintain the vapors above their condensation point until removed to a point where condensate cannot return to the liquid material under treatment.

4. A process according to claim 3 in which the fat is lard.

5. A process according to claim 3 in which the fat is cottonseed oil.

6. The process of deodorizing animal fats which comprises passing steam through a body of such an animal fatty material maintained at a temperature of at least 200° F. but under 300° F., and under a vacuum while supplying heat to the vapor zone above said liquid in order to minimize the reflux condensation of the vapor issuing from the said liquid under treatment.

7. The process of deodorizing animal fats which comprises passing steam through a body of such an animal fatty material maintained at a temperature between 200° and 300° F. while under a vacuum of at least 27 inches of mercury and in the presence of an antioxidant while supplying heat to the vapor zone above said liquid in order to minimize the reflux condensation of the vapor issuing from the said liquid under treatment.

8. The process of deodorizing relatively nonvolatile fatty material which comprises passing steam through a quantity of such fatty material, maintaining the fatty material during the steam treatment at a temperature of at least 200° F. but under 300° F., reducing the atmospheric pressure on the fatty material to remove vapors expelled therefrom, and heating the expelled vapors to maintain them above their condensation temperature until removed to a point where vapor condensate can not return to the fatty material.

9. The process of deodorizing relatively nonvolatile fatty material which comprises passing steam through a quantity of such fatty material containing a stabilizing substance, maintaining the fatty material during the steam treatment at a temperature of at least 200° F. but under 300°

F., reducing the atmospheric pressure on the fatty material to remove vapors expelled therefrom, and heating the expelled vapors to maintain them above their condensation temperature until removed to a point where vapor condensate can not return to the fatty material.

10. The process of deodorizing relatively non-volatile fatty material which comprises passing steam through a body of such fatty material containing a small amount of polyphenol, maintaining the fatty material during the steam treatment at a temperature of at least 200° F. but under 300° F. and under a vacuum, and supplying heat to the vapor zone above said liquid to minimize the reflux condensation of the vapors issuing from said liquid under treatment.

11. The process of deodorizing relatively non-volatile fatty material which comprises passing steam through a body of such fatty material containing a small amount of a substance of the class consisting of polycarboxylic acids, their esters and anhydrides, said substance having at least one group of the class consisting of olefinic and hydroxy groups, maintaining the fatty material during the steam treatment at a temperature of at least 200° F. but under 300° F. and under a vacuum, and supplying heat to the vapor zone above said liquid to minimize the reflux condensation of the vapors issuing from said liquid under treatment.

12. The process of deodorizing a relatively non-volatile fatty material which comprises passing steam through a body of such fatty material maintained at a temperature of at least 200° F. but under 300° F. and under a vacuum while maintaining sufficient of the vapor zone at a temperature above the condensation point of the vapors to prevent condensate from returning to the liquid fatty material under treatment.

13. The process of deodorizing relatively non-volatile fatty materials containing fatty acids and odorous constituents which comprises passing steam through a body of such material at a temperature of about 200°–450° F. and under a vacuum, and removing vapors in sufficient amount to substantially reduce the free fatty acids and improve the odor of the material while supplying heat to the vapors above said body of material so as to maintain the vapors above their condensation temperature until removed to a point where vapor condensate cannot be returned to the fatty material.

14. The process of deodorizing relatively non-volatile fatty materials containing fatty acids and odorous constituents which comprises passing steam through a body of such material at a temperature of about 200–450° F. while under vacuum and in the presence of an antioxidant, and removing vapors in sufficient amount to substantially reduce the free fatty acids and improve the odor of the material while supplying heat to the vapors above said body of material so as to maintain the vapors above their condensation temperature until removed to a point where vapor condensate cannot be returned to the fatty material.

15. The process of deodorizing vegetable oils containing fatty acids and odorous constituents which comprises passing steam through a body of such oil at a temperature of about 350°–450° F. and under vacuum, and removing vapors in sufficient amount to substantially reduce the free fatty acids and improve the odor of the oil while supplying heat to the vapors above said body of oil so as to maintain the vapors above their condensation temperature until removed to a point where vapor condensate cannot be returned to the oil.

GUY W. PHELPS.
HOWARD C. BLACK.